United States Patent [19]

Thibault et al.

[11] Patent Number: 5,099,009
[45] Date of Patent: Mar. 24, 1992

[54] PLANT WALL-RICH PRODUCTS CONTAINING AN INCREASED WATER-SOLUBLE FRACTION, THEIR PREPARATION, THEIR USE AND COMPOSITIONS CONTAINING THEM

[75] Inventors: Jean-Francois Thibault, Orvault; Guy Della Valle; Marie-Christine Ralet, both of Nantes, all of France

[73] Assignee: Institut National de la Recherche Agronomique (INRA), Paris, France

[21] Appl. No.: 401,912

[22] Filed: Sep. 1, 1989

[30] Foreign Application Priority Data

Sep. 5, 1988 [FR] France ................... 88-11601

[51] Int. Cl.$^5$ .............. A23N 15/00; B02C 21/00; C08B 37/06
[52] U.S. Cl. ......................... 536/2; 99/510; 99/511; 99/513
[58] Field of Search ............. 99/510, 511, 513, 521; 426/804; 536/2

[56] References Cited

U.S. PATENT DOCUMENTS

| | | | |
|---|---|---|---|
| 3,948,677 | 4/1976 | Huster | 99/511 |
| 4,034,664 | 7/1977 | Hassell | 99/511 |
| 4,139,647 | 2/1979 | Douglas | 99/521 |
| 4,506,601 | 3/1985 | Ramirez | 99/511 |
| 4,526,794 | 7/1985 | Altomare | 426/258 |
| 4,865,863 | 9/1989 | Prosise | 426/518 |
| 5,011,701 | 4/1991 | Baer | 426/573 |

*Primary Examiner*—Ronald W. Griffin
*Assistant Examiner*—Ralph Gitomer
*Attorney, Agent, or Firm*—Fleit, Jacobson, Cohn, Price, Holman & Stern

[57] ABSTRACT

Plant wall-rich products originating, for example, from higher plants naturally rich in pectins, algae, or from by-products, such as wheat bran, potato pulp, shells or oil works residues, and the like, are modified to contain a fraction of water-soluble polysaccharides which is higher than, in particular equal to at least twice that existing naturally, without modification of their overall chemical composition. To obtain them, water is added, if necessary to the natural product in the divided state, to form a mixture capable of undergoing a shearing treatment, and the resulting product is subjected to a shearing force before extrusion, resulting in modified products as aggregates which can be converted into powder. By means of aqueous extraction, performed directly on the extruded product, a water-soluble fraction is obtained, from which there are isolated, for example, pectins, with a degree of methylation $\geq 75\%$, and the extraction residue which, after drying and grinding, can be employed as alimentary fibers, as the extruded product which, having a low water content, can be directly employed.

10 Claims, 1 Drawing Sheet

PLANT WALL-RICH PRODUCTS CONTAINING AN INCREASED WATER-SOLUBLE FRACTION, THEIR PREPARATION, THEIR USE AND COMPOSITIONS CONTAINING THEM

The present invention relates to plant wall-rich products and concerns more particularly a treatment of a novel type which is applied thereto and which results in products modified by an exclusively physical route. These modified products, which are novel in themselves, can be used as alimentary fibers. They can, however, be subjected directly to an aqueous extraction which also produces novel products consisting, on the one hand, of the water-soluble fractions and, on the other hand, of the extraction residues. The latter also constitute . alimentary fibers. As for the water-soluble fractions, their nature varies depending on the starting materials. It is possible to isolate from them substances of interest which comprise pectins, carrageenans, alginates, agaroses, agar, and the like, these substances finding an application, by virtue of their thickening and gelling properties, in the manufacture of fruit preserves, of candy, and in the preparation of cooked dishes and of dairy desserts. In accordance with the invention, these substances exhibit novel characteristics which render them more particularly applicable in certain cases, as will be described hereinafter.

The plant wall-rich products consist generally of the by-products of the food industry and of agriculture which are obtained in enormous tonnages. They consist essentially of polysaccharides: pectins, hemicellulose and cellulose, which have functional and/or nutritional properties, employed by the industry. Thus, these products are sources of animal feedstuffs, of fermentable products, of alimentary fibers, soluble or otherwise, with recognized or potential nutritional effects, of polysaccharides (pectins) capable of being employed industrially as food additives, as mentioned above. The present invention also inclused within its scope the upgrading of these products.

The treatments which have been applied to them heretofore are essentially of chemical nature, being supplemented by conventional physical processes: liquid/solid separation, grinding, and the like.

By way of example, the extraction of pectins from the by-products of the fruit juice industry (apple marcs, citrus peelings) is in principle carried out hot (60°-80° C.) using an inorganic acid at pH 1-2.5, for periods which can be up to several hours. The yield is generally from 8 to 10% by weight of pectins relative to the initial solid content. The solution containing the pectins is separated from the residue by centrifuging and/or filtration techniques. This solution is next neutralized, is concentrated, and the pectins are precipitated from an alcoholic medium and recovered as a powder, ready for use.

A first disadvantage of this process is that an acidic treatment frequently causes contamination and corrosion of the vessels, with the additional disadvantage that the residues cannot be utilized, except for animal feedstuffs. Now, it is known that the residues from the extraction of pectins, or even the initial products, are potentially alimentary fibers, which are useful from a nutritional standpoint.

In addition, insofar as pectins are involved, it is known that the latter must be highly methylated (in other words must have a degree of methylation DM of more than 50%) and must have a sufficient molecular mass, so that they will be able to gel in the presence of sugar and in an acidic medium. If it is wished to obtain pectins with lower degrees of methylation, which will gel in the presence of $Ca^{2+}$ ions, in the presence or in the absence of sugar, a demethylation of the already extracted pectins must then be carried out in an acidic and alcoholic medium. The residue from the extraction of pectins, in turn, forms a by-product intended for animal feedstuffs. It appears, however, that heretofore it has not been possible to obtain pectins which have DM values of more than 75%. Such pectins could be found useful in certain applications; it is known, in fact, that the higher the DM, the higher the rate of gelling, and the lesser the need for the pH to be low for gelling to occur. Thus, such pectins would be especially applicable in a novel way to products which call for ultrarapid gelling, and to the gelling of weakly acidic sweet products.

Furthermore, as just indicated, the plant wall-rich products are sources of alimentary fibers. A renewal of interest in alimentary fibers has led the agricultural and food industry and the pharmaceutical industry to propose fiber-enriched products intended to be incorporated in products for alimentary or medical use. Alimentary fibers consist chiefly of cellulose, hemicelluloses, pectic substances and lignin. It is thought that a deficiency of alimentary fibers could lie at the source of colic disorders (constipation, diverticulosis) or metabolic disorders (diabetes, hypercholesterolemia, biliary lithiasis, obesity). The fibers' ability to absorb water increases the hydration of stools, and this facilitates intestinal transport. Fiber-rich diets increase fecal calorie losses and enable a greater intestinal bulk to be obtained, with a reduced calorie intake.

Heretofore , the production of alimentary fibers has been carried out using techniques, such as physical fractionations, in the case of wheat bran, or using grinding/washing operations in an aqueous alcoholic medium in the case of the fibers obtained from fruit or vegetables. The fibers obtained have properties which are set by the nature of the starting products. Thus, they exhibit a low water-solubility. It would therefore be advantageous to obtain, from the same starting product, fibers which could exhibit a superior water-solubility and whose solubility, and consequently degradability, could also be regulated so as to make it possible to have available products having a soluble fibers/insoluble fibers ratio adapted to the nutritional requirements on each occasion, the role of the insoluble fibers in digestive transport being predominantly directly mechanical, in comparison with the soluble fibers, whose role would appear to be predominantly metabolic. In the same way, it would be advantageous to be able to regulate the water absorption/retention properties of these fibers, insofar as they are also capable of being employed as filling components intended to provide no calorie input.

Patent application EU-A-0,086,233 describes a polysaccharide isolated from plants belonging to the Epimedium species of the Berberidaceae family, the said polysaccharide having properties of an antiinfectious and immunostimulant agent. The process for treating the plant in question is intended solely to isolate the said specific polysaccharide. It involves traditional solvent extraction stages, but it does not comprise any shearing-extrusion operation resulting in an extruded product with a low water content, capable of being directly employed in various applications, for example in alimentary compositions, by virtue of its advantageous fiber content.

The present invention relates to novel products which meet the requirements recalled above, these novel products being obtained by a novel process no longer exhibiting any of the disadvantages of the prior art. Thus, the invention proposes, firstly, plant wall-rich products modified to exhibit an increased water-soluble fraction content; these modified products forming advantageous soluble fibers/insoluble fibers combinations, which could not be obtained by the traditional acidic treatment which separated the two fractions.

The invention also relates to a solution for varying the ratio of the soluble fibers to the insoluble fibers of these modified products in a controlled manner. The process for obtaining these modified products has the advantage of resulting directly in such products, without the need for drying them, this process presenting, furthermore, no chemical corrosion or contamination problem, since the treatment with the acid is eliminated. In addition, since the modification of the starting products is exclusively physical and not chemical or biotechnological, the products obtained can be referred to as natural, which also represents an advantage from the viewpoint of dietetics and legislation.

Furthermore, an aqueous extraction carried out on these modified products produces an extract rich in soluble polysaccharides (pectins, carrageenans, alginates, and the like), which can be obtained directly by precipitation with traditional agents, such as alcohols like ethanol or isopropanol, or by means of multivalent salts such as aluminum salts, in other words without resorting to the neutralization stage of the traditional process. Moreover, according to the invention, pectins which have a very high degree of methylation, never obtained hitherto, are obtained.

The aqueous extraction also produces residues which can be employed as alimentary fibers, with a generally increased water absorption capacity.

The subject of the present invention is therefore firstly a plant wall-rich product modified to contain a water-soluble polysaccharide fraction which is higher than that existing naturally, without alteration of the overall chemical composition of the said product. In particular, the invention relates to a modified product, such as just defined, whose water-soluble polysaccharide fraction content is at least equal to 1.5 times and in particular to twice this content in the natural product.

This modified product can originate from higher plants which are naturally rich in pectins, such as apple marcs, citrus peelings and beet pulps, algae, wheat bran, potato pulp, shells, such as sunflower shells, or oil works residues. It can take the form of small-sized aggregates such as tablets, granules and the like, or else a pulverulent form. Its water content is generally less than 12% by weight on a wet basis.

Another subject of the present invention is a process for the manufacture of the product, such as defined above, wherein there is employed a plant wall-rich starting material in the divided state, water is added (if necessary) to the said product in the divided state, to obtain a mixture capable of undergoing the subsequent shearing treatment, and the product, to which water is optionally added, is subjected to a shearing force before extrusion, to obtain the required products in the form of small-sized aggregates which are, if appropriate, subjected to a grinding operation to obtain the required product in a pulverulent form.

Modified products are thus obtained, whose soluble part can be increased by a large factor, without the overall chemical composition having been altered. In some cases, these values can exceed those obtained with the corresponding acidic treatments of the prior art.

In addition, the modified products obtained have a lighter color than the initial products and require no drying, in view of low water content after extrusion. They can be subjected to shaping, depending on the geometry of the die of the extrusion apparatus. They can also be ground after extrusion so as to obtain powders of specified particle size.

The water absorption capacity of these modified products is generally unchanged after the extrusion process, despite the high percentage of soluble product. In some cases, such as that of the apple, it is increased.

Furthermore, in the majority of cases, it has been found that the quantity of water-soluble fraction which can be obtained increases linearly with the energy delivered to the product to produce the shearing, regardless of the temperature. This was not obvious and it allows the soluble fibers/insoluble fibers ratio of the modified products to be regulated.

A starting product which has a solids content of at least approximately 70% by weight on a wet basis is generally employed. Furthermore, most of the time, water will be added to the starting material, especially in a proportion of 10 to 30% by weight relative to the product as such, the quantity of water which is added being a function of the water content of the starting material and of the intensity of the treatment to be carried out.

This starting material is ground, if necessary, to have a particle size of the order of a millimeter, for example. A shear gradient which is generally between 100 and 800 $s^{-1}$ is applied, and this can be obtained by virtue of a twin-screw extruder, at a speed of rotation of between approximately 100 and 300 revolutions per minute.

Heat may be optionally introduced into the material in the shearing zone, in addition to that produced by the said shearing.

This shearing-extrusion process may be conducted in a conventional twin-screw extruder comprising a feed zone receiving, on the one hand, the starting material in the divided state and, on the other hand, water, the mixing and the transport taking place in a transport zone following the said feed zone, the transport zone itself being followed by a shearing zone, in which the screws advantageously have reverse flights and are provided with escapes enabling the material to pass through. The exit of the modified product then takes place via two dies of conventional configuration.

The present invention also relates to a process for the treatment of plant wall-rich products, wherein the abovementioned shearing-extrusion treatment is carried out and wherein the extruded product is subjected directly to an aqueous extraction making it possible to recover, on the one hand, an insoluble residue and, on the other hand, the solubilized polysaccharides. In the case of starting materials which are rich in pectins, the pectins are isolated by precipitation using traditional techniques, especially from alcoholic medium.

These pectins have a degree of methylation which is higher than 75% and, in particular from 80 to 90%. In comparison with the pectins obtained by the traditional route, they can also be characterized by an increased content of arabinose, of the order of 50 to 100%.

As for the residues from aqueous extraction, these can be characterized by a water absorption capacity of more than approximately 20 g of water per gram of dry product.

The present invention also relates to the use, as alimentary fibers, in alimentary, pharmaceutical and dietetic industry, of the modified products such as obtained by the shearing-extrusion process, and of the residues of aqueous extraction, such as defined above. The invention also relates to alimentary, pharmaceutical or dietetic compositions containing such fibers.

To further illustrate the process of the present invention, a more detailed description will be given below of an apparatus for carrying out the shearing-extrusion process of the invention, with reference to the attached drawings, in which.

Figure 1:
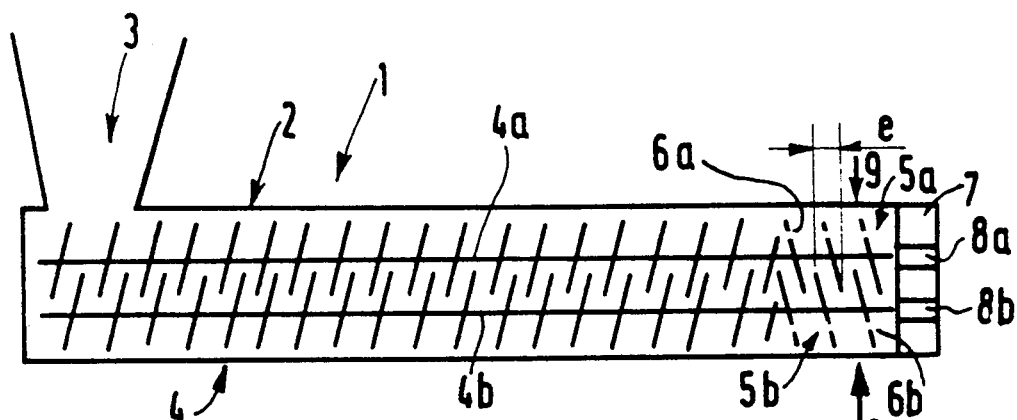
FIG. 1 is a diagrammatic view, in lengthwise axial section, of an extruder which can be employed according to the invention.

FIG. 1 of the attached drawing shows, diagrammatically, a twin-screw extruder which can be employed for carrying out the shearing-extrusion process of the invention. This extruder 1 comprises a cylindrical outer barrel 2, arranged horizontally. Arranged in an end region of the barrel 2 there is a feed hopper 3 for solid product, and a water entry shown as reference 4. Arranged inside the barrel 2 there are two interpenetrating corotative screws 4a, 4b, which are intended to guide the product-water mixture from the feed zone and via a central transport zone, to a shearing zone, in which the flights of the screws are reversed at 5a, 5b. These screw elements with reversed flights 5a, 5b are equipped with escapes 6a, 6b respectively, to allow the product to pass through. Downstream of the shearing zone, a zone 7 is set up, comprising two cylindrical dies 8a, 8b respectively. A possible heat input is, furthermore, shown as reference 9.

Figure 2:
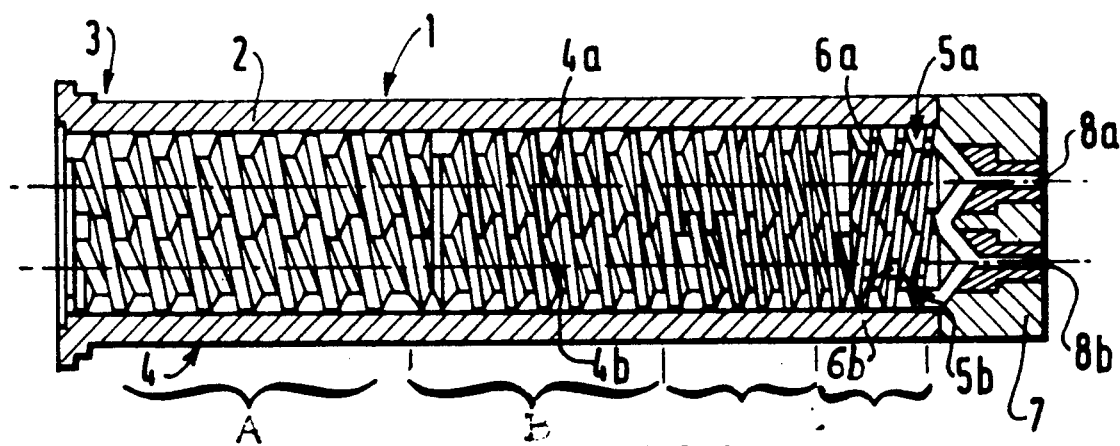
FIG. 2 is a diagrammatic view, partly in lengthwise axial section, partly in elevation, of another twinscrew extruder which can be employed for carrying out the invention.

The extruder of FIG. 2 differs from that of FIG. 1 in that it has successive feed (A) and transport (B and C) zones, with increasingly shallower flights.

Figure 3:
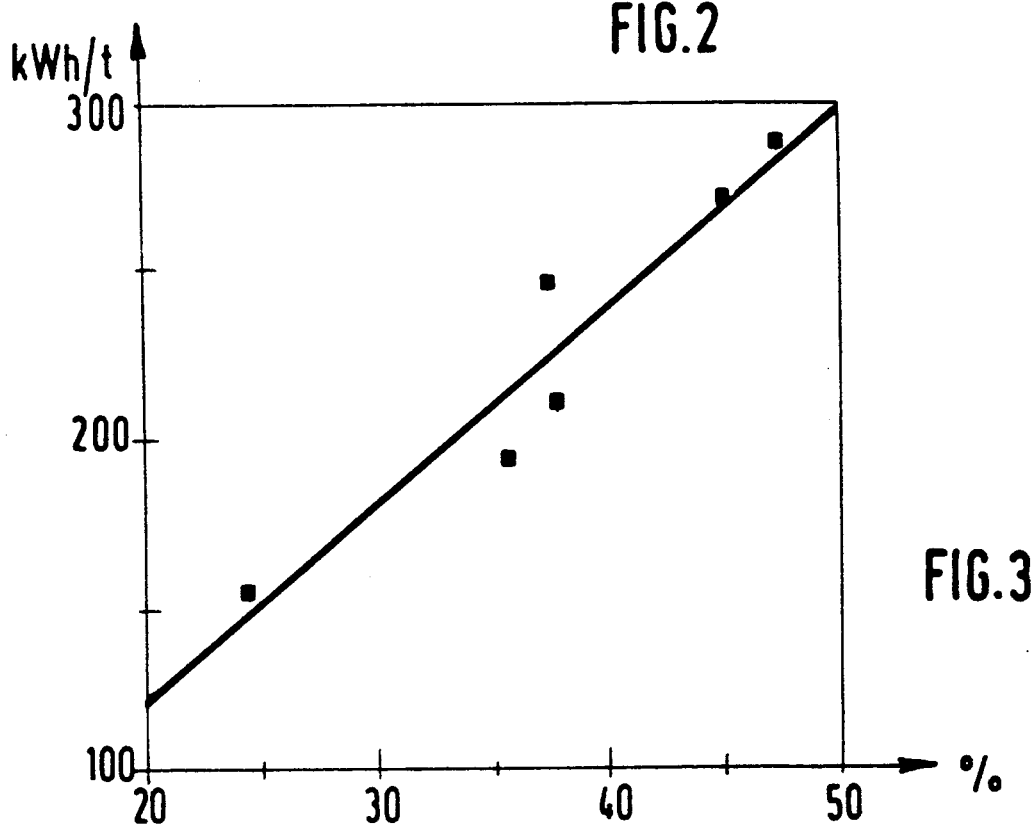
FIG. 3 is a diagram illustrating the results of the invention in a concrete example.

To further illustrate the products of the present invention, a number of embodiments thereof will be described in greater detail. Examples 1a to 1d to 2a to 2d and 3a to 3f are examples of the invention. FIG. 3 of the attached drawing is associated with Examples 3a to 3f. The following have been employed: for measuring water absorption, the method described in the paper entitled "Structure and Properties of Sugar Beet Fibres", C. Bertin, X. Rouau, and J. F. Thibault, J. Sci. Food Agric. (1988) Volume 44, pages 15–29; and for the characterization of the pectins (Table 4), the methods described in the paper entitled "Characterisation and Oxydative Crosslinking of Sugar Beet Pectins extracted from Cossettes and Pulps under different conditions", J. F. Thibault, Carbohydrate Polymers (1988) No. 8, pages 209–223.

REFERENCE EXAMPLE 1 and EXAMPLES 1a to 1d:

Treatment of Apple Marcs

Apple marcs whose solids content is 89.3% by weight are employed. They are ground with the aid of a Rousselle hammer mill (linear velocity : 100 m/s), fitted with a 2-mm grid. The product obtained is the product in accordance with Reference Example 1.

The shearing-extrusion treatment of the invention is then carried out, by adding to the product of Reference Example 1, each time, a quantity of water, such as shown in Table 1, expressed as a percentage relative to the weight of the initial product as such, and then by conducting the actual treatment, certain parameters also being varied as shown in Table 1, in a Clextral BC45 cooker-extruder apparatus of a type of that described with reference to FIG. 2, with the following main characteristics:

The total length of the barrel 2 is approximately 1 meter, the interaxial distance between the two screws 4a and 4b 45 mm, and the cylindrical dies 8a, 8b have a radius of 2 mm and a length of 30 mm. The gap e between the screws is 1 mm or less.

The temperature shown in Table 1 is that of the barrel 2 before the die zone 7, and the number of revolutions per minute refers to the speed of rotation of the screws (4a, 4b), expressing the filling rate of the latter at a constant throughput. The intensities of the treatments in accordance with Examples 1a to 1d were evaluated by measuring the mechanical energy supplied by the main motor (E, expressed in kWh/t).

The following were then measured, in the case of the product of Reference Example 1 and those of Examples 1a to 1d:

the percentage of water-insoluble matter;

the percentage of water-soluble matter; and water absorption.

An aqueous extraction was conducted in a conventional manner by employing one gram of extruded product in 3 times 100 ml of water. The separation was carried out by centrifuging.

Gel permeation chromatography (GPC) runs on Sepharose CL2B gel, carried out on the aqueous extract showed two populations: one of high molecular mass, consisting essentially of galacturonic acids, and the other, of lower molecular mass, consisting chiefly of neutral oses. The pectins were then precipitated from the aqueous extract in an alcoholic medium (80% by volume of ethanol in the final mixture), this making it possible to remove at least partially the population of lower molecular mass. Table 1 also shows:

the content of galacturonic acids (GAA) and the content of neutral oses (NO), both calculated as percentages of the initial product; and the percentage of the initial product which can be precipitated with 80% ethanol (Example 1b).

All the results obtained are shown in Table 1.

COMPARATIVE EXAMPLE 1

After the same starting material had been ground in the same way as in Example 1, a conventional pectin extraction treatment was carried out: 5 g of product extracted with three 150-ml portions of 0.05N HCl at 85° C. for 3×30 minutes. The measurements performed on this product were the same as in the case of Reference Example 1 and Examples 1a to 1d, the results being also shown in Table 1.

TABLE 1

| Example | Treatment after grinding | | | Water-insolubles (%) | Water-solubles | | | | Water absorption (ml/g) | |
|---|---|---|---|---|---|---|---|---|---|---|
| | | | | | (%) | % GAA | % NO | % precipitables | before aqueous extraction | after aqueous extraction* |
| Ref. 1 | None | | | 78.4 | 21.6 | 1.5 | 7.3 | | 8.1 | 9.5 |
| | Shearing-extrusion at 100° C. | | | | | | | | | |
| | % added water | Revolutions/min | E (kW h/t) | | | | | | | |
| 1a | 20 | 150 | 156.9 | 63.5 | 36.5 | 5.4 | 10.9 | | 18.1 | 22.3 |
| 1b | 20 | 250 | 230.4 | 60 | 40 | 7.4 | 12.1 | 12.1 | 16.5 | 22.2 |
| 1c | 10 | 250 | 265.8 | 48.7 | 51.3 | 9.5 | 16.6 | | 13.1 | 22.3 |
| 1d | 30 | 250 | 175.6 | 66.9 | 33.1 | 5 | 10.1 | | 17.6 | 21.4 |
| Comp. 1 | Acidic extraction | | | 59.6 | 40.4 | 9.3 | 16.2 | 13.7 | 13.7 | |

*This parameter is discussed in Example 4

Referring to Table 1, it is found that the water solubility of the products of Examples 1a to 1d is higher than that of the reference product 1. This solubility increases with an increase in the speed of rotation of the screws and with a decrease in the quantity of water which is added, in other words, with the increase in the mechanical energy supplied by the main motor of the extruder.

The acidic treatment of Comparative Example 1 enables approximately 40% of the weight of apple marcs to be solubilized. The shearing-extrusion treatment enables an equal solubilization to be obtained, or even to be exceeded (Example 1c).

The water absorption capacity of these products increases considerably (by about twice) after the shearing-extrusion treatment of the invention (without aqueous extraction).

The total GAA and NO composition shows that the soluble matter is enriched in polysaccharides, when compared with the reference product. These results are comparable with those obtained in the case of Comparative Example 1 (acidic extraction of the pectins), which shows the effectiveness of the shearing-extrusion treatment of the invention in increasing the water-soluble polysaccharide (or fiber) fraction.

In addition, the percentage of total, soluble and insoluble fibers was measured in the case of the product of Reference Example 1 and that of Example 1b.

The determination was carried out according to the method of Prosky et al., (Journal of Association of Official Analytical Chemistry, Vol. 71, no. 5, 1988).

Referring to Table 1bis, it is found that the total fiber content of the product of Example 1b is identical with that of the reference product 1 (70-71%). The soluble fiber content of the product of Example 1b is much higher than that of the reference product 1. These results show that the soluble fiber fraction is increased without any alteration in the total fiber content.

Insofar as the fraction which can be precipitated is concerned, this is obtained in a 12% yield, which is comparable with the percentage obtained in the case of the acidic extraction, also showing the effectiveness of the process of the invention.

The pectins, which have open shown to have been obtained in yields similar to those of the acidic extraction, were studied in greater detail, their characteristics being shown in Table 4.

Referring to Table 4, it is found that apple pectins obtained after shearing-extrusion have a higher molecular mass than those obtained by an acidic route. The pectins obtained according to the invention have higher contents of galacturonic acids and higher degrees of methylation and of acetylation than those obtained in the case of the acidic extraction.

It should be stressed that the degree of methylation obtained is very high, since it is about 90%. This value has never been obtained by acidic extraction because in a medium of this kind the ester functional groups can be hydrolyzed, and so the degrees of methylation are limited to 70%. This gives the apple pectins thus obtained gelling characteristics which differ from those obtained by an acidic route, because an increase in the degree of methylation shortens the gelling time and raises the pH of gelling. Thus, with the pectins of the invention it has not been possible to obtain true gels (homogeneous gels) in the conventional conditions for gelling highly methylated pectins (pH=2.4; 90° C.; 65% of sucrose), but rather pregels or heterogeneous gels, these phenomena being due to excessively fast gelling at this pH. When the pH is raised to 3, true gels are obtained with 1.8% concentrations of pectins of the invention.

REFERENCE EXAMPLE 2 and EXAMPLES 2a to 2d,

COMPARATIVE EXAMPLE 2:

Treatment of Citrus Peelings

The procedure was the same as in the case of apple

TABLE 1 bis

| Example | Treatment after grinding | | | | Total fibers % | Insoluble fibers % | Soluble fibers % |
|---|---|---|---|---|---|---|---|
| Ref. 1 | None | | | | 70 | 57.5 | 12.5 |
| | Shearing-extrusion | | | | | | |
| | added water % | Temp (°C.) | Revolutions/min | E (kW h/t) | | | |
| 1b | 20 | 100 | 250 | 230.4 | 71 | 47 | 24 | marcs, and the results have been shown in the same way. The solids content of the initial products was 89.8% by weight.

The comments which can be given are the same as above, the acidic treatment solubilizing approximately 50% by weight of the citrus peelings, a value which is exceeded in the case of the shearing-extrusion treatment of the invention. Using the process of the invention, it is therefore possible to obtain treated citrus peelings in which the soluble part has been increased by a factor of two to three without the overall chemical composition being changed.

Insofar as the water absorption capacity is concerned, the results show that the values are not altered, and that they are even slightly increased after the shearing-extrusion treatment of the invention.

With regard to the percentage of substances which can be precipitated with 80% ethanol, it is found that pectins can be obtained in a yield of the order of 25%, a value equal to that obtained by acidic extraction.

If reference is now made to Table 4, it is found that the molecular mass is half that of the product extracted by an acidic route and that the pectins obtained have higher contents of galacturonic acids, and a degree of methylation and a degree of acetylation which are higher than those obtained in the case of the acidic extraction. This degree of methylation is also remarkable, since it is of the order of 85%. Gels were obtained in the same conditions as previously.

The procedure was the same as in the case of the apple marcs (Example 1) where measuring the percentage of total, soluble and insoluble fibers. The results are collected in Tables 2bis and 2ter. The same comments as before can be made when referring to Table 2bis, namely that the cooking-extrusion treatment produces a large increase in the soluble fiber content without alteration in the total fiber content.

When referring to Table 2ter, it is found that the percentage of substances which can be precipitated with 80% ethanol (17.9–33.2) is proportionally higher, the more powerful the extrusion treatment.

The molecular mass decreases when the severity of the treatment increases. All the pectins obtained by extrusion have contents of galacturonic acids, degrees of methylation and degrees of acetylation which are higher than those of comparative Example 2. The contents of neutral oses are significantly higher. An increase is observed in the contents of rhamnose, of arabinose (except for the product of Example 2c) and of galactose, and a decrease in the content of galacturonic acids, as a function of the severity of the treatment.

TABLE 2

| Example | Treatment after grinding | | | Water-insolubles (%) | Water-solubles | | | | Water absorption (ml/g) | |
|---|---|---|---|---|---|---|---|---|---|---|
| | | | | | (%) | % GAA | % NO | % precipi-tables | before aqueous extraction | after aqueous extraction* |
| Ref. 2 | None | | | 79.7 | 20.3 | 2.5 | 4.7 | | 14.5 | 27.2 |
| | Shearing-extrusion at 100° C. | | | | | | | | | |
| | % added water | Revolutions/min | E (kW h/t) | | | | | | | |
| 2a | 20 | 150 | 167 | 54.1 | 45.9 | 14.6 | 12.1 | | 15.4 | 28.8 |
| 2b | 20 | 250 | 227.2 | 54.1 | 45.9 | 17.9 | 11.8 | 24.7 | 18.3 | 28.7 |
| 2c | 10 | 250 | 300.5 | 40 | 60 | 22.4 | 12.6 | | 13.6 | 27.3 |
| 2d | 30 | 250 | 188.3 | 64.8 | 35.9 | 12.9 | 8.7 | | 15.8 | 22.3 |
| Comp. 2 | Acidic extraction | | | 49.6 | 50.4 | 22.9 | 13.2 | 24.8 | 15.9 | |

*This parameter is discussed in Example 4

TABLE 2 bis

| Example | Treatment after grinding | | | | | Total fibers % | Insoluble fibers % | Soluble fibers % |
|---|---|---|---|---|---|---|---|---|
| Ref. 2 | None | | | | | 86.1 | 54.4 | 31.7 |
| | Shearing-extrusion | | | | | | | |
| | added water % | Temp (°C.) | Revolutions/min | E (kW h/t) | | | | |
| 2b | 20 | 100 | 250 | 227.2 | | 87.2 | 33.5 | 53.7 |

TABLE 2 ter

| Treatment of example | 2a + aqueous extraction | 2b + aqueous extraction | 2c + aqueous extraction | 2d + aqueous extraction | Comp. 2 |
|---|---|---|---|---|---|
| Yield | 27.2 | 24.7 | 33.1 | 17.9 | 24.8 |
| Intrinsic viscosity (ml/g) | 166 | 220 | 62 | 330 | 546 |
| Molecular mass | 34100 | 42100 | 16350 | 57000 | 82900 |
| Degree of methylation | 76.5 | 84.9 | 80.9 | 79.2 | 72.1 |
| Degree of acetylation | 5 | 4.7 | 7.3 | 4.1 | 2.2 |
| Content of galacturonic acids | 69.3 | 69.6 | 65.1 | 71.7 | 61.5 |
| Content of neutral oses of which: | 16.2 | 11.8 | 15.5 | 11.7 | 8.8 |
| rhamnose | 0.9 | 0.7 | 1.1 | 0.6 | 0.7 |

TABLE 2-continued

|  | ter | | | | |
|---|---|---|---|---|---|
| Treatment of example | 2a + aqueous extraction | 2b + aqueous extraction | 2c + aqueous extraction | 2d + aqueous extraction | Comp. 2 |
| arabinose | 7.8 | 5.6 | 4.5 | 4.8 | 5 |
| xylose | 0.8 | 0.7 | 0.8 | 0.8 | 0.1 |
| mannose | 1.2 | 0.7 | 1.4 | 1.3 | 0 |
| galactose | 4.2 | 2.8 | 6.3 | 2.7 | 2.4 |
| glucose | 1.3 | 1.3 | 1.4 | 1.5 | 0.6 |

REFERENCE EXAMPLE 3, EXAMPLES 3a to 3f and COMPARATIVE EXAMPLE 3:

Treatment of Beet Pulps

The procedure was the same as above and the results have been shown in the same way (Table 3). The solids content of the initial products was 90.6% by weight. The same comments as previously can be made. Furthermore, FIG. 3 shows the curve obtained by plotting the percentage of soluble fibers as the abscissae and the energy supplied by the main motor of the extruder as the ordinates, which shows a good correlation between these two values (correlation coefficient: 0.94).

The percentage of total soluble and insoluble fibers was also measured, as in the other examples. The results are collected in Table 3bis. The same comments as previously can be made. In the case of the product of Example 3e, the soluble fiber fraction is greatly increased without there being any alteration in the total fiber content. In the case of the product of Example 3b, the treatment applied being severe, a slight loss of total fibers is noted.

TABLE 3

| Example | Treatment after grinding | | | | Water-insolubles (%) | Water-solubles | | | | Water absorption (ml/g) | |
|---|---|---|---|---|---|---|---|---|---|---|---|
| | | | | | | (%) | % GAA | % NO | % precipitables | before aqueous extraction | after aqueous extraction* |
| Ref. 3 | None | | | | 83.4 | 16.6 | 0.7 | 6.1 | | 19.3 | 24.7 |
| | Shearing-extrusion | | | | | | | | | | |
| | added water % | Temp (°C.) | Revolutions/ min | E (kW h/t) | | | | | | | |
| 3a | 20 | 100 | 150 | 211.2 | 62.1 | 37.9 | 11.4 | 10.4 | | 19.8 | 27.3 |
| 3b | 20 | 100 | 250 | 270.7 | 54.8 | 45.2 | 14.5 | 13.3 | 22.2 | 14.4 | 28.8 |
| 3c | 30 | 100 | 250 | 245.9 | 62.5 | 37.5 | 9.8 | 7.8 | | 18.9 | 26.2 |
| 3d | 30 | 100 | 150 | 154.6 | 75.6 | 24.4 | 4.8 | 6.4 | | 17.1 | 22.6 |
| 3e | 30 | 180 | 150 | 193.8 | 64.3 | 35.7 | 8.9 | 9.6 | | 18.7 | 26.1 |
| 3f | 20 | 180 | 250 | 287.3 | 52.5 | 47.5 | 13 | 15.1 | | 13.4 | 21.9 |
| Comp. 3 | Acidic extraction | | | | 50.5 | 49.5 | 10.9 | 14.7 | 18.6 | 28.8 | |

*This parameter is discussed in Example 4

TABLE 3 bis

| Example | Treatment after grinding | | | | Total fibers % | Insoluble fibers % | Soluble fibers % |
|---|---|---|---|---|---|---|---|
| Ref. 3 | None | | | | 72.5 | 62.4 | 10.3 |
| | Shearing-extrusion | | | | | | |
| | added water % | Temp (°C.) | Revolutions/ min | E (kW h/t) | | | |
| 3b | 20 | 100 | 250 | 270.7 | 67.5 | 38.5 | 29 |
| 3e | 30 | 180 | 150 | 193.8 | 72.8 | 47.8 | 25 |

TABLE 4

| Treatment of example | 1b + aqueous extraction | Comp. 1 | 2b + aqueous extraction | Comp. 2 | 3b + aqueous extraction | Comp. 3 |
|---|---|---|---|---|---|---|
| Intrinsic viscosity (ml/g) | 240 | 166 | 220 | 546 | 110 | 310 |
| Molecular mass | 44 900 | 34 000 | 42 100 | 82 900 | 25 100 | 54 400 |
| Degree of methylation | 90 | 74.1 | 84.9 | 72.1 | 78.5 | 75.4 |
| Degree of acetylation | 7.1 | 6 | 4.7 | 2.2 | 39.1 | 30.7 |
| Content of galacturonic acids | 54.4 | 34.2 | 69.6 | 61.5 | 45.3 | 41.2 |
| Content of neutral oses of which: | 21.5 | 12.4 | 11.7 | 8.9 | 17.3 | 12.0 |
| rhamnose | 0.8 | 0.7 | 0.7 | 0.7 | 1.4 | 1.2 |
| arabinose | 6.5 | 3.8 | 5.6 | 5.0 | 10.5 | 4.9 |
| xylose | 0.7 | 0.8 | 0.7 | 0.1 | 0.2 | 0.1 |
| mannose | 0.3 | 0.0 | 0.7 | 0.0 | 0.2 | 0.1 |

TABLE 4-continued

| Treatment of example | 1b + aqueous extraction | Comp. 1 | 2b + aqueous extraction | Comp. 2 | 3b + aqueous extraction | Comp. 3 |
| --- | --- | --- | --- | --- | --- | --- |
| galactose | 2.6 | 4.1 | 2.8 | 2.4 | 2.8 | 2.8 |
| glucose | 10.7 | 3.4 | 1.3 | 0.6 | 2.3 | 2.9 |
| Ferulic acid | 1.0 | 0.9 | — | — | — | — |

Table 5 shows the carbohydrate composition (% solids content) of the starting products, of the residues of aqueous extraction performed on the extruded products, and of the products consisting of the residues of the conventional acidic extraction.

bran. Treated wheat brans whose water-soluble fraction has been increased by a factor close to 2 can therefore be obtained by the process of the invention without the overall chemical composition having been changed.

Insofar as the water absorption capacity is concerned,

TABLE 5

| Treatment of Example | Ref 1 | Ref 1 | 1a | 1b | 1c | 1d | Comp 1 | Ref 2 | Ref 2 | 2a | 2b | 2c | 2d | Comp 2 |
| --- | --- | --- | --- | --- | --- | --- | --- | --- | --- | --- | --- | --- | --- | --- |
| | | | + aqueous extraction | | | | | | | + aqueous extraction | | | | |
| Rhamnose | 1 | 1.4 | 1.4 | 1.2 | 1.7 | 1.8 | 2.1 | 1.5 | 1.7 | 2.1 | 1.9 | 1 | 1.4 | 2.8 |
| Arabinose | 6 | 5.2 | 6.1 | 4.1 | 2.5 | 6 | 2 | 7 | 8.6 | 7 | 7.3 | 2.4 | 8.1 | 2.3 |
| Xylose | 3.5 | 3.1 | 5.1 | 4.7 | 7.6 | 5.1 | 8.3 | 2.5 | 3.2 | 4.8 | 4.3 | 4.3 | 3.1 | 5.5 |
| Mannose | 2 | 1.2 | 2.1 | 1.9 | 1.8 | 1.8 | 2.5 | 2.9 | 2.8 | 3.8 | 3.4 | 3.2 | 2.7 | 4.3 |
| Galactose | 4.3 | 4.2 | 6.1 | 5.1 | 3.8 | 5.6 | 5.4 | 5.4 | 6.1 | 7.2 | 6.7 | 4.3 | 6.5 | 6.6 |
| Glucose | 17 | 14.2 | 20.7 | 19.2 | 18.9 | 17 | 17 | 12.4 | 10.3 | 15.7 | 13.4 | 15.7 | 11.5 | 17.9 |
| Galacturonic acids | 13.8 | 13.7 | 13.1 | 10.9 | 5.5 | 12.6 | 11.8 | 29.2 | 30.3 | 21.2 | 19.9 | 13 | 25 | 22.5 |
| Total | 47.6 | 43 | 54.6 | 47.1 | 41.8 | 49.9 | 49.1 | 60.9 | 6.3 | 61.8 | 56.9 | 43.9 | 58.3 | 61.9 |

| Treatment of Example | Ref 3 | 3a | 3b | 3c | 3d | 3e | 3f | Comp 3 |
| --- | --- | --- | --- | --- | --- | --- | --- | --- |
| | | + aqueous extraction | | | | | | |
| Rhamnose | 1.7 | 0.8 | 0.9 | 0.9 | 1.3 | 1.6 | 0.8 | 0.8 | 2.4 |
| Arabinose | 10.7 | 9.8 | 8.9 | 8.4 | 7.4 | 8.9 | 8.3 | 7 | 6.3 |
| Xylose | 0.6 | 0.5 | 0.6 | 0.7 | 0.5 | 0.5 | 0.5 | 0.9 | 3 |
| Mannose | 0.9 | 0.6 | 0.7 | 0.8 | 0.7 | 0.6 | 0.5 | 0.7 | 2 |
| Galactose | 4.1 | 3.1 | 3.3 | 3.1 | 3.3 | 3.2 | 3 | 2.8 | 5.1 |
| Glucose | 26.4 | 14.4 | 21.6 | 23.2 | 22.2 | 18.1 | 17.3 | 25.5 | 15 |
| Galacturonic acid | 17.9 | 15.2 | 9 | 7.9 | 11 | 13.3 | 12.2 | 7.2 | 15.1 |
| Total | 62.3 | 44.4 | 45 | 45 | 46.4 | 46.2 | 42.6 | 44.9 | 48.9 |

The results show that apart from a depletion in galacturonic acids and a possible enrichment in glucose (originating from cellulose), these residues have overall compositions close to the initial products. Their total content of polysaccharides is generally as high as that of the initial products. Alimentary fibers can be obtained from these products after drying and grinding. Furthermore, the process significantly improves the color of the products obtained.

In Tables 1 to 3 the absorption properties have been shown each time for the apple, the citrus and the beet, respectively. The values obtained for these fibers are generally higher than those of the initial products, before or after extrusion, or than those of the residues from acidic extraction.

REFERENCE EXAMPLE 4 AND EXAMPLES 4a to 4d

Treatment of Wheat Bran

A commercial wheat bran is employed, with a particle size smaller than or equal to 2 mm and a solids content of 87.3% by weight. This product is the product in accordance with Reference Example 4.

The shearing-extrusion treatment of the invention is then carried out by using the same procedure as in the case of the apple marcs (Example 1).

Referring to Table 6, it is found that the most severe shearing-extrusion treatment gives rise to a solubilization of approximately 40% of the weight of the wheat the results show that the values are increased in the case of the products of Examples 4a to 4b and slightly decreased in the case of the product of Example 4d.

Referring to Table 7, it is found that the soluble fiber content is increased by up to a factor of 1.7 without there being any alteration in the total fiber content. In the case of the product of Example 4d, the treatment applied being particularly severe, a slight loss of total fibers is observed.

The composition of neutral oses shows that the soluble matter is enriched in polysaccharides when compared with the reference product 4.

The soluble fibers were studied in greater detail. When referring to Table 8 it is found that the xylose, arabinose and glucose contents are increased. Gel permeation chromatography runs on Sephacryl-S-200, carried out on the soluble fibers, showed three populations: the first two, of high molecular mass, made up essentially of arabinoxylanes, and the other one, of lower molecular mass, made up essentially of glucose.

Table 9 shows the carbohydrate composition (% solids content of the reference product) of the reference products and of the residues from aqueous extraction.

The results show that, apart from a depletion in arabinose and in xylose, these residues have overall compositions close to the reference product.

The water absorption properties have been shown in Table 6. The values obtained are higher than those of the initial products before or after extrusion.

TABLE 6

| Example | Treatment after grinding | | | | Water-insolubles (%) | Water-solubles | | Water absorption (ml/g) | |
|---|---|---|---|---|---|---|---|---|---|
| | | | | | | (%) | % NO | before aqueous extraction | after aqueous extraction |
| Ref. 3 | None | | | | 75.7 | 24.3 | 10.7 | 2.7 | 4.1 |
| | Shearing-extrusion | | | | | | | | |
| | added water % | Temp (°C.) | Revolutions/min | E (kW h/t) | | | | | |
| 4a | 17.5 | 100 | 250 | 230 | 77.1 | 22.9 | 13 | 3.8 | 4.4 |
| 4b | 8.7 | 100 | 250 | 300 | 68.3 | 31.7 | 18.7 | 3 | 4.9 |
| 4c | 11.3 | 100 | 240 | 310 | 67.4 | 32.6 | 21.2 | 3.4 | 4.8 |
| 4d | 6.1 | 100 | 240 | 380 | 59.9 | 40.1 | 27.5 | 2.3 | 4.5 |

TABLE 7

| Example | Treatment after grinding | | | | Total fibers % | Insoluble fibers % | Soluble fibers % |
|---|---|---|---|---|---|---|---|
| Ref. 4 | None | | | | 50.4 | 42.3 | 8.1 |
| | Shearing-extrusion | | | | | | |
| | added water % | Temp (°C.) | Revolutions/min | E (kW h/t) | | | |
| 4a | 17.5 | 100 | 250 | 232 | 52.2 | 41.4 | 10.8 |
| 4b | 8.7 | 100 | 250 | 301 | 51.2 | 38.3 | 12.9 |
| 4c | 11.3 | 100 | 240 | 316 | 51.4 | 37.5 | 13.9 |
| 4d | 6.1 | 100 | 240 | 386 | 46.7 | 30.7 | 16 |

TABLE 8

| Treatment of Example | Ref 4 | 4a | 4b | 4c | 4d |
|---|---|---|---|---|---|
| Rhamnose | — | — | — | — | — |
| Arabinose | 15.7 | 14.7 | 16.3 | 16.8 | 16.2 |
| Xylose | 26.8 | 26 | 38.2 | 40.8 | 48.7 |
| Mannose | 14.5 | 12.7 | 6.9 | 6.7 | 4 |
| Galactose | 4.4 | 4 | 3.9 | 3.7 | 3.1 |
| Glucose | 15 | 15.1 | 19.1 | 19.1 | 19.7 |
| Uronic acids | 3.9 | 1.6 | 2 | 1.9 | 1.9 |
| Total | 80.3 | 74.1 | 86.4 | 89 | 93.6 |

TABLE 9

| Treatment of Example | Ref 4 | Ref 4 + aqueous extraction | 4a | 4b | 4c | 4d |
|---|---|---|---|---|---|---|
| Rhamnose | — | — | — | — | — | — |
| Arabinose | 9.6 | 9 | 8.6 | 7.4 | 8.2 | 7.1 |
| Xylose | 16.5 | 16.2 | 16.6 | 13.4 | 14.7 | 13.2 |
| Mannose | 1.3 | 0 | 0 | 0.3 | 0.3 | 0.4 |
| Galactose | 1.2 | 0.8 | 0.8 | 1 | 0.7 | 0.7 |
| Glucose | 19.6 | 23.2 | 19.3 | 15 | 18.9 | 16.5 |
| Uronic acids | 6.6 | 5 | 4.9 | 4.3 | 4 | 3.6 |
| Total | 54.8 | 54.2 | 50.2 | 41.4 | 46.8 | 41.5 |

REFERENCE EXAMPLE 5 and EXAMPLES 5a and 5c

Treatment of Beet Fibers

Commercial beet fibers are employed, with a particle size smaller than or equal to 2 mm and a solids content of 87.3% by weight. This product is the product in accordance with Reference Example 5.

The shearing-extrusion treatment of the invention is then carried out using the same procedure as in the case of the apple marcs (Example 1).

When referring to Table 10 it is found that the shearing-extrusion treatment gives rise to a solubilization of 37.7 to 50.2% of the weight of the beet fibers. The degree of water-solubility of Reference Example 5 is very low. The shearing-extrusion treatment enables the soluble fraction to be increased by a factor of 7 to 10.

The soluble matter is highly enriched in neutral oses and in galacturonic acids. Table 11 shows the carbohydrate composition (% by weight) of the freeze-dried soluble fractions.

The results show a high solubilization of galacturonic acids, of arabinose and, to a lesser extent, of galactose.

TABLE 10

| Example | Treatment after grinding | | | | Water-insolubles % | Water solubles | | |
|---|---|---|---|---|---|---|---|---|
| | | | | | | (%) | % GAA | % NO |
| Ref. 4 | None | | | | 94.9 | 5.1 | 0.2 | 1.7 |
| | Shearing-extrusion | | | | | | | |
| | added water % | reverse flight | Revolutions/min | E (kW h/t) | | | | |
| 5a | 30 | 4 | 240 | 293 | 49.8 | 50.2 | 16.3 | 20.7 |
| 5b | 48 | 4 | 240 | 234 | 60.3 | 37.7 | 15.2 | 11.3 |
| 5c | 48 | 3 | 240 | 239 | 60.5 | 39.5 | 15.4 | 9.4 |

TABLE 11

| Treatment of Example | Ref 5 | 5a | 5b | 5c |
|---|---|---|---|---|
| Rhamnose | 0 | 1.9 | 1.4 | 1 |

TABLE 11-continued

| Treatment of Example | Ref 5 | 5a | 5b | 5c |
| --- | --- | --- | --- | --- |
| Arabinose | 1.8 | 27.9 | 18.2 | 15.2 |
| Xylose | 0 | 0 | 0 | 0 |
| Mannose | 4.3 | 1.2 | 1.3 | 1 |
| Galactose | 0 | 6.3 | 4.6 | 3.3 |
| Glucose | 26.9 | 4 | 4.6 | 3.4 |
| Uronic acids | 4.5 | 32.5 | 40.3 | 39.1 |
| Total | 37.5 | 71.9 | 69 | 62 |

We claim:

1. A physically-modified and chemically unaltered plant wall-rich food product derived from a natural product and comprising a water-soluble polysaccharide fraction content at least equal to 1.5 times that which is present in the natural product from which the modified product is derived, the ratio of water-soluble fibers/water-insoluble fibers in the modified product being significantly higher than that in said natural product.

2. A modified product as claimed in claim 1, wherein its water-soluble polysaccharide fraction content is at least equal to twice that content in the natural product.

3. A modified product as claimed in either of claims 1 and 2, which it originates from a naturally pectin-rich higher plant.

4. A modified product as claimed in one of claims 1 and 2, which is in a pulverulent form.

5. A modified product as claimed in one of claims 1 and 2, which has a water content not exceeding 12% by weight on a weight basis.

6. A modified product as claimed in claim 3, wherein the naturally pectin-rich higher plant is a member selected from the group consisting of apple marc, citrus peeling, beet pulp, and potato pulp.

7. A modified product as claimed in claim 1 which is in the form of small-sized aggregates.

8. In the preparation of an alimentary, pharmaceutical or dietetic composition comprising alimentary fiber, the improvement wherein the alimentary fiber is in the form of a product as claimed in claim 1.

9. In a plural component alimentary, pharmaceutical or dietetic composition containing alimentary fiber, the improvement wherein the alimentary fiber is in the form of a product as claimed in claim 1.

10. A modified product as claimed in claim 1 which is an extrudate comprising pectins having a degree of methylation which is higher than 75 percent.

* * * * *